(12) United States Patent
Sego

(10) Patent No.: US 7,819,091 B2
(45) Date of Patent: Oct. 26, 2010

(54) APPARATUS FOR INCREASING THE FUEL EFFICIENCY OF AN INTERNAL COMBUSTION ENERGY DEVICE BY WATER ELECTROLYSIS

(76) Inventor: James T. Sego, 11191 N. 510 Rd., Tahlequah, OK (US) 74464

( * ) Notice: Subject to any disclaimer, the term of this patent is extended or adjusted under 35 U.S.C. 154(b) by 757 days.

(21) Appl. No.: 11/880,977

(22) Filed: Jul. 26, 2007

(65) Prior Publication Data
US 2009/0026087 A1    Jan. 29, 2009

(51) Int. Cl.
F02B 43/08    (2006.01)
(52) U.S. Cl. .................................... 123/3; 123/DIG. 12
(58) Field of Classification Search .................. 123/1 A, 123/3, DIG. 12; 205/633, 637
See application file for complete search history.

(56) References Cited
U.S. PATENT DOCUMENTS
6,257,175 B1 *    7/2001    Mosher et al. .................. 123/3

* cited by examiner

Primary Examiner—Noah Kamen
(74) Attorney, Agent, or Firm—Fellers, Snider, Blankenship, Bailey & Tippens, P.C.; Terry L. Watt

(57) ABSTRACT

A water electrolysis unit delivers hydrogen to an internal combustion engine. The electrolysis unit comprises an outer housing and an inner container. Between the outer housing and the inner container is a space for the collection of gases. The upper portion of the inner container is provided with a series of alternating peaks and valleys. At the tops of the peaks are louvered openings which permit the gases formed in the electrolysis to enter the space between the inner container and the outer housing. At the bottom of each valley of the inner container are a plurality of electrically conductive sleeves. The bottom of the inner container is provided with a series of troughs which are disposed beneath the valleys and in which the lower ends of the conductive sleeves are received. Each sleeve is provided with a plurality of holes which are disposed on the outside of the sleeve. A supply of water is provided to the troughs and a conventional pump is employed to pump water from the water into the troughs to keep the water at a constant level therein. An electrode projects downwardly into the center of each sleeve.

3 Claims, 5 Drawing Sheets

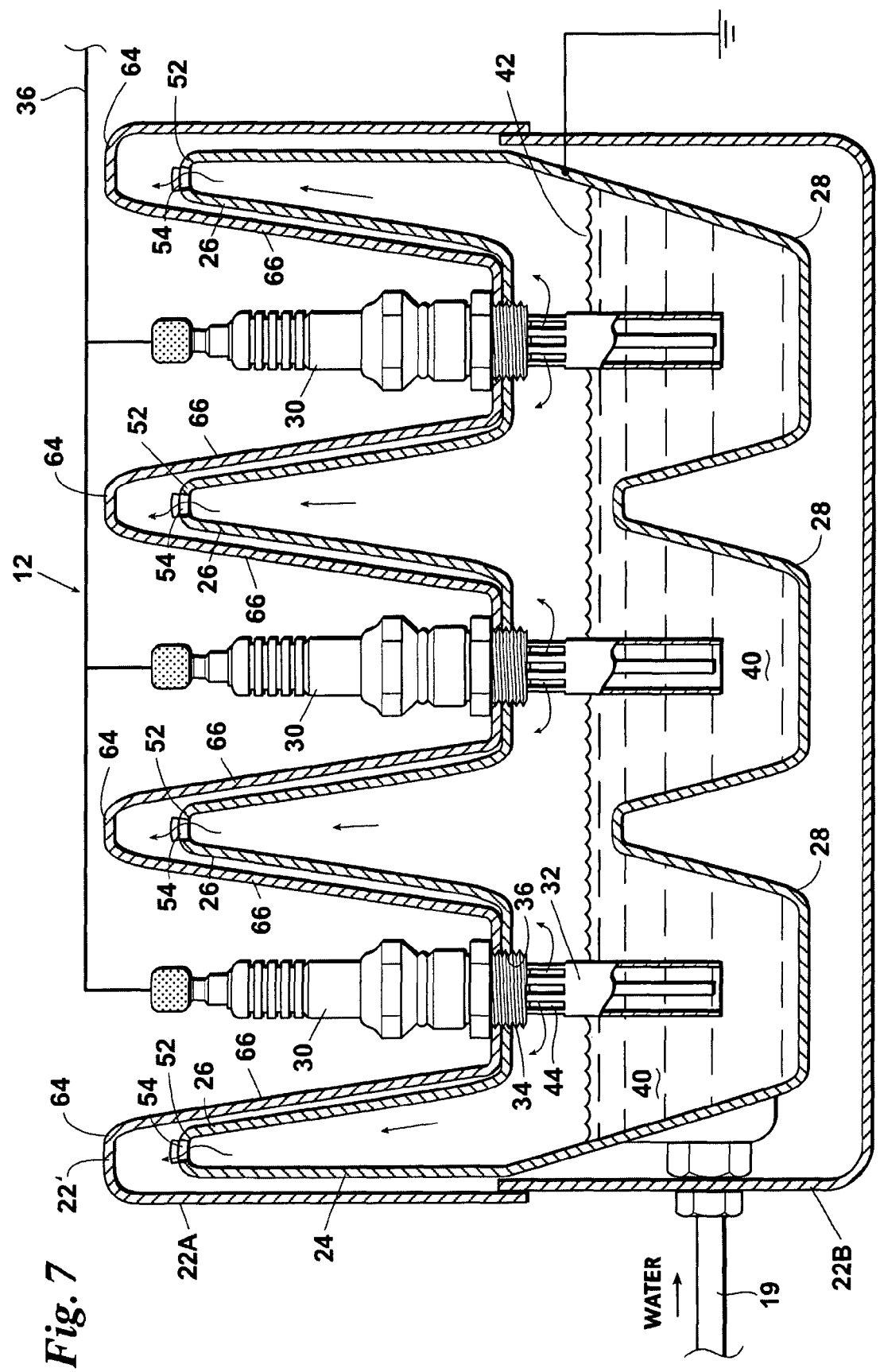

APPARATUS FOR INCREASING THE FUEL EFFICIENCY OF AN INTERNAL COMBUSTION ENERGY DEVICE BY WATER ELECTROLYSIS

BACKGROUND OF THE INVENTION

1. Field of the Invention

The present invention relates to a device for increasing the fuel efficiency of an internal combustion engine. More particularly, the device of the present invention involves a unit which is to be placed between the air filter on an internal combustion energy device and the intake manifold such that air flowing through this unit from the filter to the intake manifold will pick up gases such as oxygen and hydrogen produced by the device and mix it with the air taken into the engine to increase the efficiency of the combustion; increasing the efficiency of combustion will inherently decrease the amount of pollutants released into the atmosphere. Even more particularly, the device of the present invention includes a plurality of electrolysis cells arranged in parallel and operated by spark plugs.

2. Prior Art

There have been many proposals put forth in the past to increase the fuel efficiency of an internal combustion engine by water electrolysis; however, none of the prior art teachings show or suggest the arrangement of electrolysis cells as particularly set forth herein.

SUMMARY OF THE INVENTION

The present invention involves a water electrolysis unit which is disposed between the outlet of the air filter of a conventional internal combustion engine and the inlet to the intake manifold of the internal combustion engine. The electrolysis unit comprises an outer housing and an inner container which is disposed entirely within the outer housing. Between the outer housing and the inner container is a space for the collection of gases. The upper portion of the inner container is provided with a series of alternating peaks and valleys. At the tops of the peaks are louvered openings which permit the gases formed in the electrolysis to enter the space between the inner container and the outer housing. The louvers are disposed in a direction towards the outlet of the unit so that when gasses pass through the unit from the air filter to the intake manifold for the engine, a venturi effect is produced so that the gasses tend to leave the unit rather than go into the louvered openings. At the bottom of each valley of the inner container are a plurality of electrically conductive sleeves. The bottom of the inner container is provided with a series of troughs which are disposed beneath the valleys respectively and in which the lower ends of the conductive sleeves are received. Each sleeve is provided with a plurality of holes which are disposed on the outside of the sleeve above the level of water in the troughs.

A supply of water is conveniently contained within a source located in the trunk of the automobile or some other convenient place. A conventional pump is provided to pump water from the supply of water into the troughs in the inner container. A float is disposed upon the level of water in the troughs and will control the operation of the pump to keep the water at a constant level. The water supply may be placed in a position that allows gravity and a simple float to keep the water at a constant level. A spark plug is received within each of the valleys and is threadedly connected to the top of each sleeve in an air tight relation. The inner container will be conveniently grounded to the chassis of the automobile in any convenient manner and the upper ends of the spark plugs will be provided with a source of electrical power so that electrolysis of water takes place within each of the sleeves. The gases produced by the electrolysis will pass through the openings at the upper ends of the sleeves through the louvered openings up at the tops of the peaks and into the gas stream that flows through the unit from the air filter to the intake manifold.

In a modified embodiment of the present invention, the outer housing is provided with peaks and valleys which are parallel with the peaks and valleys of the inner container so as to provide external access to the spark plugs.

BRIEF DESCRIPTION OF THE DRAWINGS

FIG. 7 is a sectional view similar to FIG. 6 but showing a modified form of outer housing.

DETAILED DESCRIPTION OF THE PREFERRED EMBODIMENTS

Figure 1:
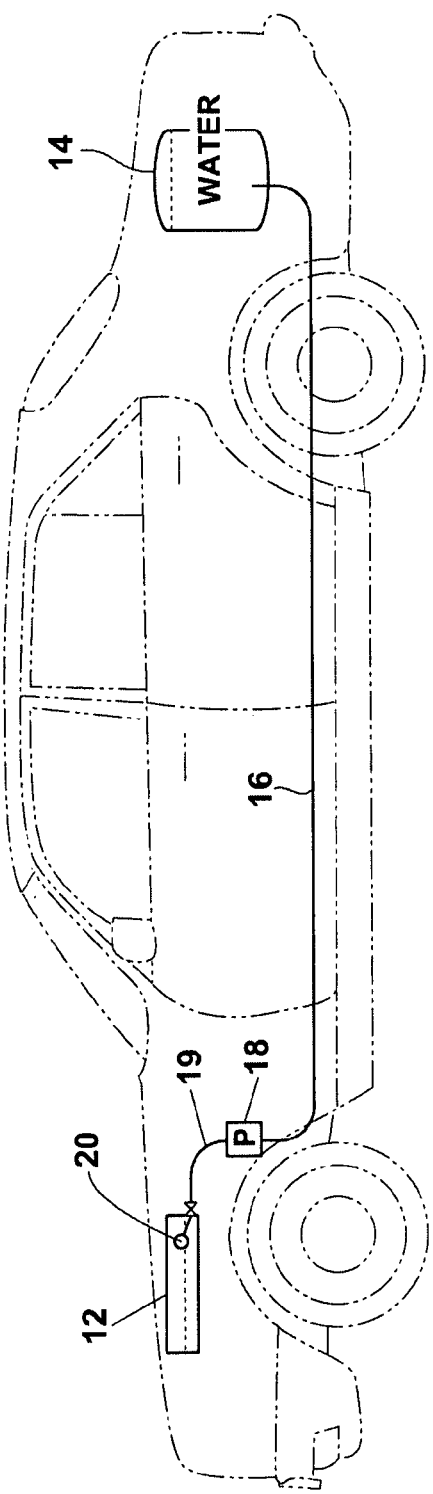
FIG. 1 is a semi-diagrammatic view of a vehicle (shown in phantom lines) indicating the device of the present invention being in the front of the car under the hood, a water supply in the trunk of the car, a pump between the water supply and the invention, and a float in the invention to operate the pump.

Referring to the drawings in detail, FIG. 1 shows an automobile 10 (in phantom lines) with the electrolysis device or unit 12 of the present invention being located under the hood of the automobile. It should be understood that the unit of the present invention is connected between the air filter (not shown) and the intake manifold (not shown) for the engine. In order to make the unit 12 work, a supply of water is required from a water tank 14 which is conveniently located anywhere on the vehicle. In the present drawings, the tank is shown as being in the trunk or trunk area of the automobile. A water line 16 connects the water supply 14 to a pump 18 which in turn pumps water into the device 12 of the present invention. The pump feeds water into the unit 12 through a water line 19. A float 20 located within the unit 12 senses the level of liquid in that unit and will control the operation of the pump 18 in a conventional manner so as to maintain a proper level in the unit 12.

Figure 2:
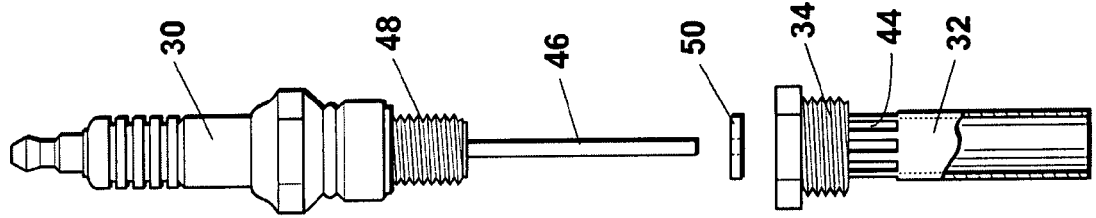
FIG. 2 is an exploded view of a spark plug and sleeve used in the present invention.
Figure 4:
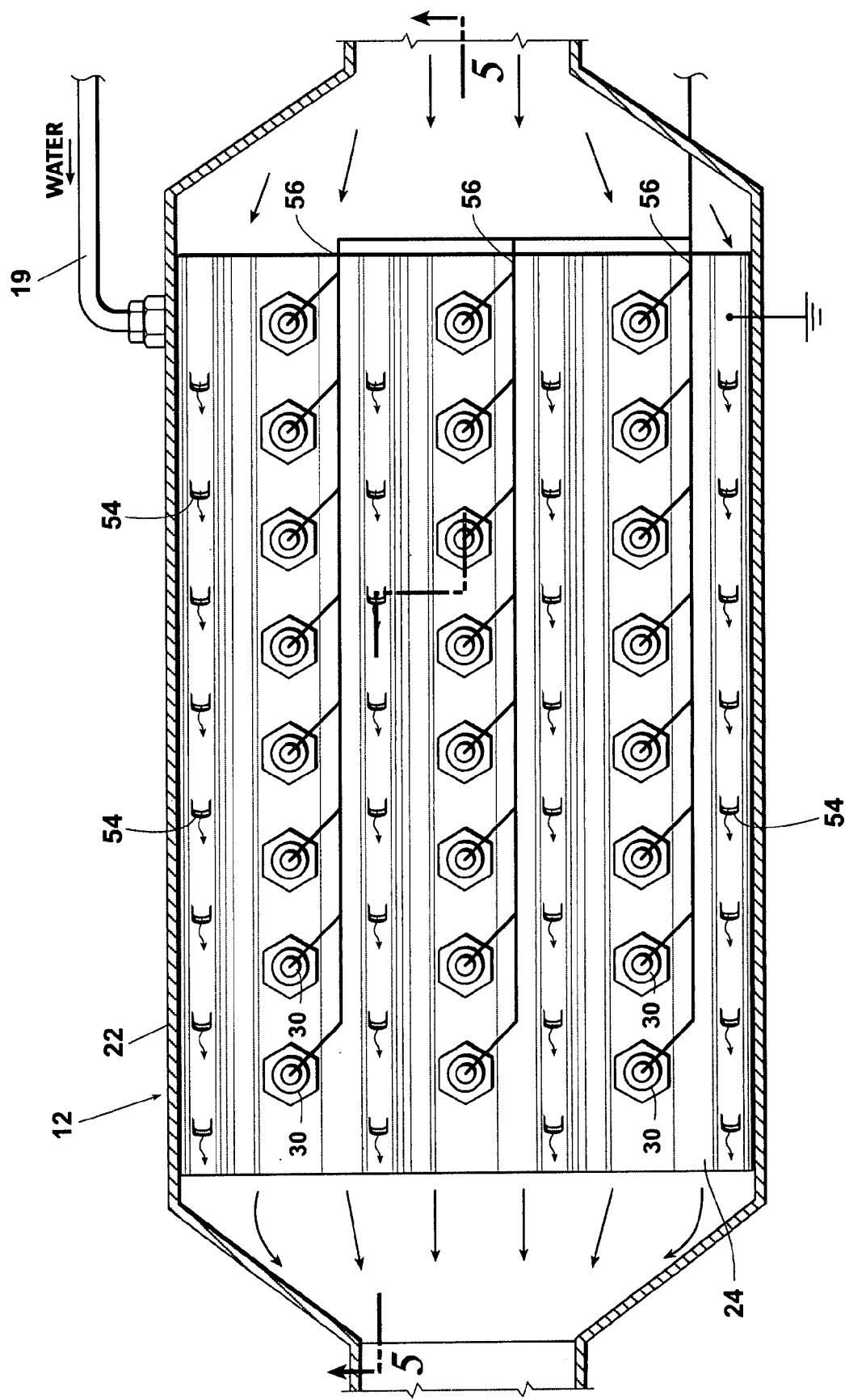
FIG. 4 is a top plan view of the present invention which is to be placed in the combustion system of the automobile between the air filter and the intake manifold.

Turning now to FIG. 2, the device 12 of the present invention includes an outer housing or container 22 and an inner container 24.

Figure 3:
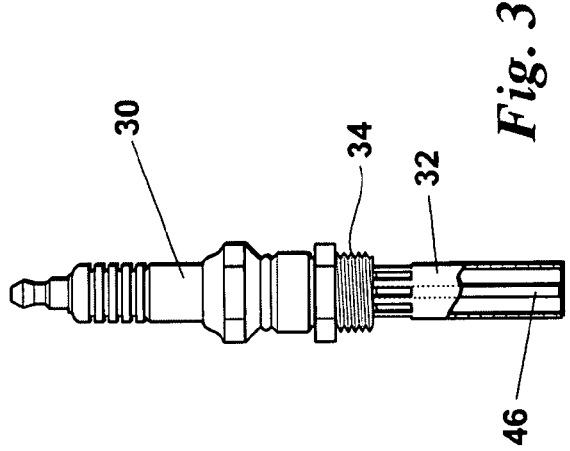
FIG. 3 is a side elevation of the parts of FIG. 2 assembled.
Figure 6:
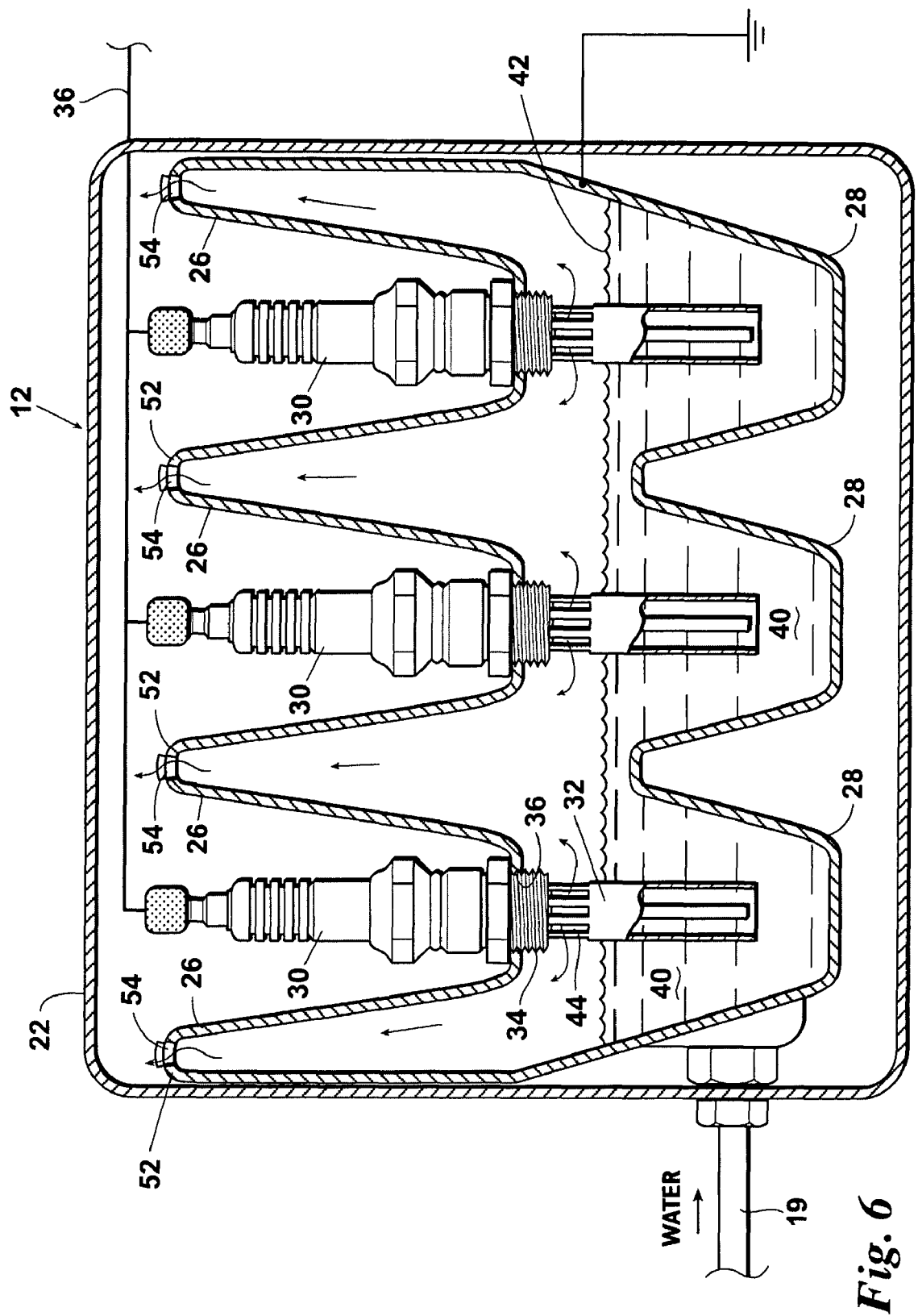
FIG. 6 is a sectional view taken along section line 6-6 of FIG. 5.

The shape of the outer housing 22 can be generally regular as shown in FIG. 6; i.e., essentially rectangular in shape (except as provided in FIG. 7). The inner container 23, however, is not regularly shaped. The container 23 is essentially the same length as the main portion of the outer container 22 but in cross-section is considerable different. Looking at FIG. 6, for example, the container 23 is shown as having along its upper portion, three substantially indented portions or valleys 26 and along its lower portion three troughs 28 in which the water solution is to be contained. Within the troughs 26 are disposed a plurality of spark plugs 30 which will be described hereinafter. At the bottom of each indent 26 is located a sleeve 32 which is open at the top and bottom and which is provided with a threaded end 34 (see now FIGS. 2 and 3) which is received in a threaded opening 36 at the bottom of each trough 26. When water 40 is supplied to the inner container 24 it will fill the troughs 28 roughly through to level 42 shown. This level can be controlled by means of the float 20 which operates the pump 18 through conventional valves and controls (not shown). The float 20 will turn the pump 18 on and off in a conventional manner to maintain a proper level. The sleeves 32 are open at the bottom as indicated and are provided with slots 44 at the upper end of each sleeve and preferably above the level of liquid 42 in the container 24. The spark plug 30 has a lower electrode 46 and a threaded portion 48 which is adapted to be received in a threaded portion (not shown) in the upper end of the sleeve 32. When the spark plug is fully received in the sleeve 32 the electrode 46 will extend essentially to the bottom open end of the sleeve 32. In order to seal the bottom of the plug from the solution to prevent oxidation, a plastic washer 50 can be placed on the bottom of the plug before screwing it into the sleeve. The hole in the washer should fit snugly around the electrode 46.

Figure 5:
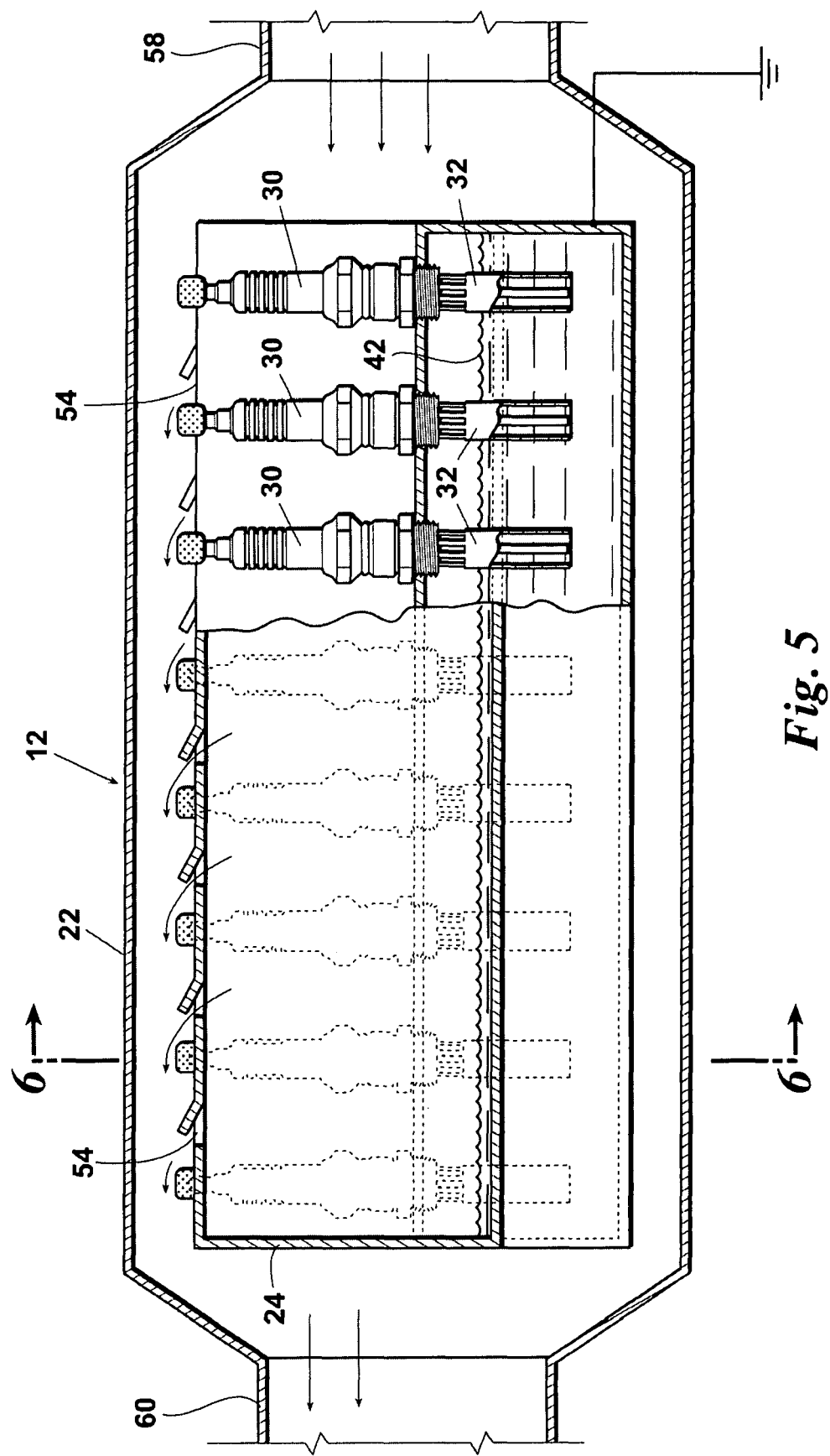
FIG. 5 is a sectional view of the unit shown in FIG. 4 taken along section line 5-5 of FIG. 4.

As best shown in FIG. 6, the portions of the container 24 on opposite sides of the ridges or valleys 26 form peaks 52 on opposite sides of the spark plugs 30. These peaks, along their upper points are provided with slotted openings or slits 54 which are created by perforating the metal and bending it to form louvers such that the openings are directed toward the left as they appear in FIG. 5. This louvered effect of the openings 54 is such that the gases passing through the outer chamber 22 tend to draw the gases from the opening 54 in a venturi effect.

As also shown in FIG. 6, an electrical current is provided by an alternator (not shown) through an electrical conduit 56 which connects with the tops of the spark plugs 30. The container 24 is grounded to the chassis as shown. When electricity is supplied to the spark plugs, they create electrolysis cells. Each sleeve 32 has slots 44 therein above the level 42 of the solution to allow the oxygen and hydrogen to escape into the air chamber. The slits 54 are higher on the back side to force air over the slit instead of catching the air and forcing it down into the container 24. Filtered air comes into the unit 12 through the inlet opening 58 which is in communication with the air filter (not shown). Gases leave the unit 12 through the outlet opening 60 and go into the intake manifold (not shown). The gases that pass from the inlet 58 through the unit 12 and out the outlet 60 will pick up the hydrogen and oxygen produced and issuing from the louvered openings 54. The hydrogen and oxygen are therefore introduced into the engine along with the filtered air. The enriched mixture will add fuel to be introduced into the engine and will also burn much more of the fuel already being taken into the combustion chamber. In addition to the extra power created, the pollutants introduced into the atmosphere are greatly reduced.

FIG. 7 shows a modification of the invention involving a change in the configuration of the outer container 22 to permit access to the spark plugs 30 etc. More particularly, FIG. 7 shows a outer housing 22' comprising an upper cover member 22A and a lower rectangular bottom 22B. The bottom 22B is shaped precisely the same as the bottom of the outer container 22 shown in FIG. 6. However, the upper portion 22A is shaped considerably different and is provided with valleys corresponding with the valleys 26 and peaks corresponding with the peaks 52 inner container 24. Thus, the cover member 22A of the outer container 22 is provided with alternate peaks 64 which are disposed above the peaks 52 of the inner container 24 and valleys 66 which extend down between the peaks 66 and are parallel with the peaks 26 of the inner container 24. At the bottom of the valleys 26 the cover member is bent inwardly and is provided with a hole to receive the sleeve 32 therein. When the sleeve is screwed into the threaded portion 36 of the valley 26 of the inner container 26 it will hold the bottom of the valley of the outer cover member 22A snugly against the bottom of the valley 26 of the inner container 24. With the arrangement shown in FIG. 7, one merely need lift the hood of the automobile and the spark plugs 30 are exposed and can be removed using a conventional socket wrench. The spaces provided in FIG. 7 in the valley area of the spark plug are somewhat larger than in FIG. 6 to make sure that adequate room is provided for the insertion of socket wrenches.

A variety of catalysts and surfactants can be added to the water solution to add in the process of electrolysis. Ordinary salt (sodium chloride) is one of the best and least expensive additives that can be used. The electrodes may eventually become corroded because of the catalysts or other impurities in the water. This can be partially eliminated by making the electrodes from metals that are good conductors of electricity but which will not react with impurities in the water. These metals are commonly known as noble medals. The electrodes in this device may be easily cleaned by removing the plug and sleeve and cleaning of the corrosion. The electrical current is provided by an alternator (not shown) connected directly to the device an increase in speed of the engine will increase the strength of the current. This will increase the amount of hydrogen and oxygen produced. If needed a coil (not shown) or some other device may be used to increase the strength of the current produced by the alternator. The type of metal and the shape of the container also allow air passing through the device to cool the water solution. The container is grounded to the frame or other appropriate place on the vehicle. The container that holds the water solutions must be made out of copper or some other material that is an efficient conductor of electricity.

Whereas the present invention has been described in particular relation to the drawings attached hereto, it should be understood that other and further modifications of the present invention, apart from those shown or suggested herein, may be made within the spirit and scope of this invention.

What is claimed is:

1. A device for increasing the fuel efficiency of an internal combustion engine comprising:
    an outer housing,
    an inner container disposed entirely within the outer housing and forming a gas collection space there between,
    an inlet to the device connecting the gas collection space with the outlet of an air filter,
    an outlet to the gas collection space connecting with the intake manifold of the internal combustion device,
    an inner container having a plurality of upwardly projecting peaks and downwardly disposed valleys between the peaks,
    the container having a bottom portion containing a plurality of troughs disposed beneath the valleys, respectively,
    a plurality of electrically conductive sleeves received at the bottom of each valley and projecting downwardly into its associated trough,
    a means for supplying electrically conductive water to the troughs,
    a means for controlling the level of the water in the troughs,
    each electrically conductive sleeve having an upper end which threadedly engages the lower end of each valley and further having a lower end which is disposed below the level of water in the troughs, each sleeve also having a plurality of openings therein above the level of the liquid in the troughs for allowing escape of electrolysis gases from each sleeve, an electrode projecting downwardly into the center of each sleeve and terminating at a lower end adjacent the lower end of the sleeve, a means for supplying an electric current to each of the electrodes so that the electrically conductive water in each sleeve in the annular space between the electrode and the sleeve is subject to electrolysis, the peaks in the inner container being provided with louvered openings at the peaks whereby gases passing through the unit will pick up from the louvered openings and pass it into the intake manifold.

2. A device for increasing the fuel efficiency of an internal combustion engine as set forth in claim 1 wherein each electrode is connected to:

a spark plug disposed in the valley of the inner container.

3. A device for increasing the fuel efficiency of an internal combustion engine as set forth in claim 2 wherein the outer housing comprises:

an upper cover member and a lower bottom disposed beneath the troughs of the inner container, the outer housing having a plurality of upwardly projecting peaks and downwardly disposed valleys between the peaks corresponding with and parallel to the peaks and valleys of the inner container and being spaced therefrom to provide the gas collection space, the bottom of each valley of the cover member being provided with a hole corresponding with a hole in the inner container and in which the upper end of the sleeve threadedly engages the lower end of the valley of the inner container to hold the bottom of the valley of the cover member snugly against the bottom of the inner container, whereby the spark plugs are accessible for removal.

* * * * *